United States Patent [19]
Miyanari

[11] Patent Number: 5,864,720
[45] Date of Patent: Jan. 26, 1999

[54] DISTANCE MEASURING APPARATUS

[75] Inventor: Hiroshi Miyanari, Kawasaki, Japan

[73] Assignee: Canon Kabushiki Kaisha, Tokyo, Japan

[21] Appl. No.: 808,970

[22] Filed: Feb. 19, 1997

[30] Foreign Application Priority Data

Feb. 20, 1996 [JP] Japan .................................. 8-032503

[51] Int. Cl.$^6$ .............................. G03B 13/36; G01C 3/08
[52] U.S. Cl. ........................................ 396/106; 356/3.08
[58] Field of Search .......................... 396/106; 356/3.08

[56] References Cited

U.S. PATENT DOCUMENTS

5,613,167  3/1997  Suzuki ............................. 396/106
5,617,174  4/1997  Mikami ........................... 396/106 X

*Primary Examiner*—W. B. Perkey
*Attorney, Agent, or Firm*—Morgan & Finnegan LLP

[57] ABSTRACT

A distance measuring apparatus in which two, right and left optical systems respectively comprise sensors (5, 6) is disclosed. Sensor output values (35, 36) representing received-light images (31, 32) on the sensors (5, 6) suffer variations due to sensitivity differences between the sensors (5, 6). In order to correct the variations, the minimum values ($RD_L$, $RD_R$) of the two sensor output values are normalized to zero level, and thereafter, the smaller maximum value (e.g., $S_R$) is normalized to the larger maximum value (e.g., $S_L$). The correlation calculation is made on the basis of the two normalized sensor outputs to calculate the distance to the object to be measured.

17 Claims, 8 Drawing Sheets

FIG. 5A (LEFT)

FIG. 5B (RIGHT)

FIG. 6

DISTANCE MEASURING APPARATUS

BACKGROUND OF THE INVENTION

The present invention relates to a distance measuring apparatus and method for measuring the distance to an object to be measured on the basis of a signal obtained by photoelectrically converting an optical image of the object to be measured.

In a conventional distance measuring apparatus, a light-emitting element projects a beam spot brought to a focus via a projection lens, light reflected by an object is received by a position detection means (such as a PSD or the like), and the distance to the object is measured based on the principle of trigonometric measurements using the received-light output. Also, for example, Japanese Patent Publication No. 5-22843, Japanese Patent Application No. 7-40542, or the like has proposed a distance measuring apparatus, which can perform so-called skimming for discharging (resetting) a predetermined amount of charges, which correspond to external light components other than signal components obtained upon incidence of a beam spot and are obtained from a light-receiving element, by circulating the received-light output obtained by receiving the beam spot projected by a light-emitting element and brought to a focus via a projection lens, i.e., charges obtained by photoelectric conversion, in a charge transfer means such as a CCD, which is arranged in a ring shape, so as to integrate the charges. Furthermore, based on this apparatus, a distance measuring apparatus, which has two light-receiving systems and calculates the distance on the basis of the correlation between two received-light images obtained by the two light-receiving systems, has been proposed by Japanese Patent Application No. 7-263182. Such distance measuring apparatus is used in an AF (auto-focusing) mechanism of a camera and the like.

The distance measuring apparatus proposed by Japanese Patent Application No. 7-263182, i.e., the apparatus which can perform skimming, has two light-receiving systems, and calculates distance based on the correlation between two received-light images obtained by the two light-receiving systems, will be briefly described below with reference to FIG. 6. This apparatus is the foundation of the present invention.

Figure 6:
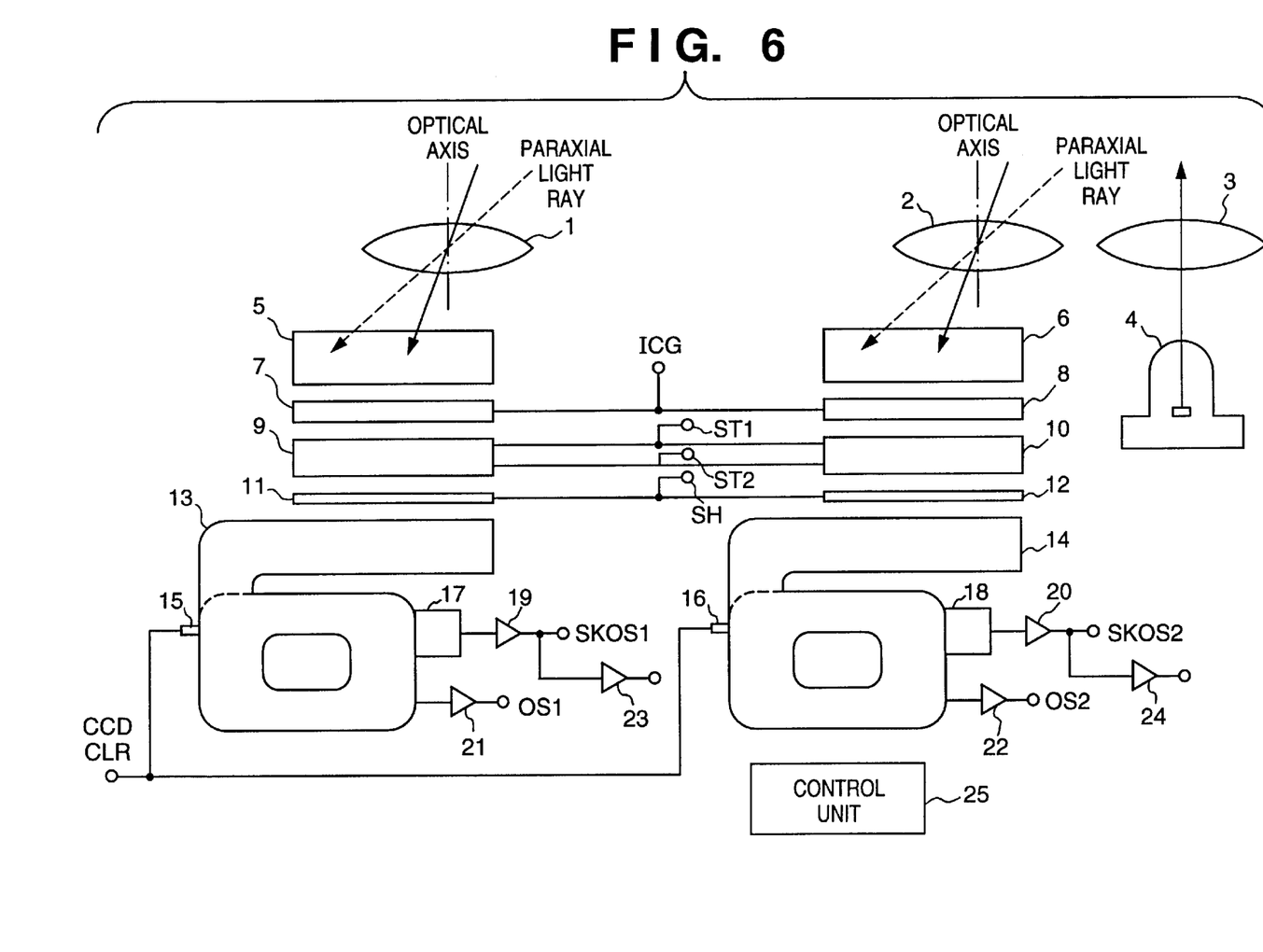
FIG. 6 is a diagram showing a distance measuring apparatus to which the prior art and the present invention can be applied.

Referring to FIG. 6, reference numeral 1 denotes a first light-receiving lens for forming the first optical path; 2, a second light-receiving lens for forming the second optical path; 3, a projection lens for projecting a beam spot onto the object to be measured; and 4, a light-emitting element which is turned on/off to project the beam spot. Reference numerals 5 and 6 denote first and second sensor arrays, each consisting of a linear array of a plurality of sensors. Reference numeral 7 denotes a first clear portion providing an electronic shutter function of clearing charges photoelectrically converted by the sensors of the first sensor array 5 in accordance with pulses ICG (Integration Clear Gate). Reference numeral 8 denotes a second clear portion providing an electronic shutter function for clearing charges photoelectrically converted by the sensors of the second sensor array 6 in accordance with the pulses ICG as in the first electronic shutter portion 7.

Reference numeral 9 denotes a first charge accumulation portion, which includes ON and OFF accumulation portions (not shown) for accumulating charges obtained by the first sensor array 5, and accumulates charges in units of pixels in accordance with pulses ST (storage) 1 and ST2 which are respectively synchronous with the ON and OFF periods of the light-emitting element 4. Reference numeral 10 denotes a second charge accumulation portion, which accumulates charges obtained by the second sensor array 6 in units of pixels in accordance with the pulses ST1 and ST2 as in the first charge accumulation portion 9. Reference numeral 11 denotes a first charge transfer gate for parallelly transferring charges accumulated in the first charge accumulation portion 9 to a charge transfer means (e.g., a CCD; to be described below) in accordance with pulses SH (shift). Reference numeral 13 denotes a first charge transfer means, which partially or entirely has a ring-shaped arrangement, and independently adds charges accumulated in the first charge accumulation portion 9 during the ON and OFF periods by circulating them. A portion that forms the circulating portion will be referred to as a ring CCD hereinafter, and a portion other than the circulating portion will be referred to as a linear CCD hereinafter. Reference numeral 12 denotes a second charge transfer gate, which is the same as the first charge transfer gate 11. Reference numeral 14 denotes a second charge transfer means, which is the same as the first charge transfer means.

Reference numeral 15 denotes a first initialization means for performing initialization by resetting charges in the first charge transfer means 13 in response to pulses CCDCLR (clear). Reference numeral 17 denotes a first skim means for resetting a predetermined amount of charges. Reference numeral 18 denotes a second skim means similar to the first skim means 17. Reference numeral 19 denotes a first output means for outputting a signal SKOS1 used for discriminating whether or not a predetermined amount of charges are to be reset. The first output means 19 reads out the charge amount present in the first charge transfer means 13 in a non-destructive manner while leaving them as charges. Reference numeral 20 denotes a second output means for similarly outputting a signal SKOS2. Reference numeral 21 denotes an output means for sequentially reading out charges in the first charge transfer means 13, and outputting them as signals OS1. Similarly, reference numeral 22 denotes an output means for outputting signals OS2 based on charges in the second charge transfer means 14. Reference numeral 23 denotes a first comparator for discriminating based on the signal SKOS1 if skimming is to be performed. Reference numeral 24 denotes a second comparator for performing discrimination based on the signal SKOS2 as in the first comparator 23. Reference numeral 25 denotes a control unit including a microcomputer for controlling the entire apparatus and performing calculations.

Skimming in the above-mentioned distance measuring apparatus will be explained below.

Figure 7A:
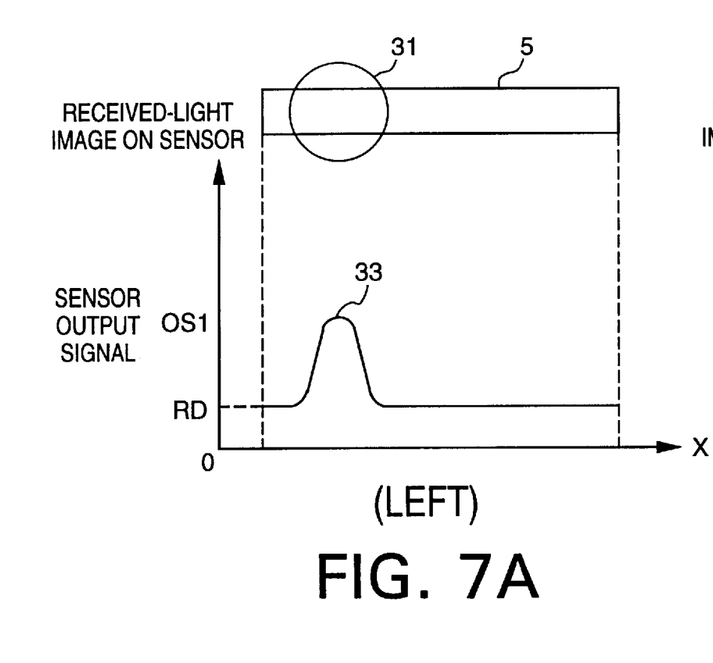
FIGS. 7A and 7B are views showing the received-light images and sensor output signal waveforms for explaining the principle of distance measurements.
Figure 7B:
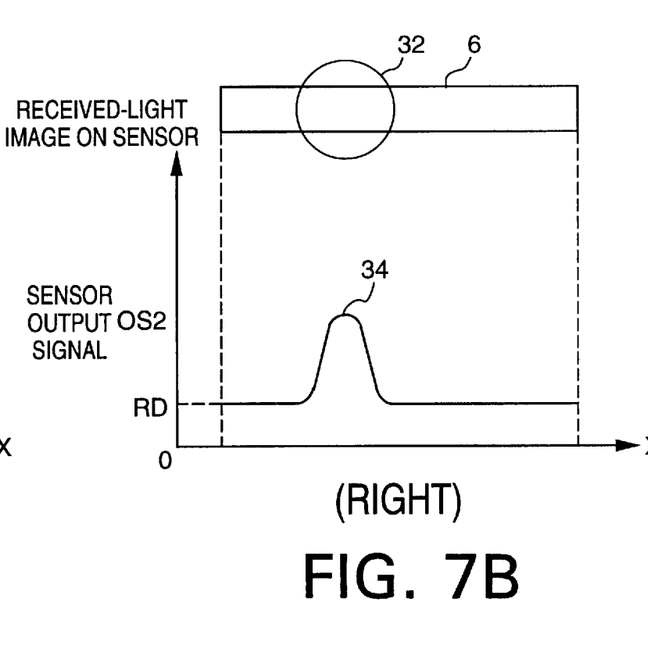

FIGS. 7A and 7B show received-light images 33 and 34 as the signal waveforms of the output signals OS1 and OS2 from the sensors, which respectively correspond to received-light images 31 and 32 on the first (left) and second (right) sensor arrays 5 and 6. In the coordinate system in FIGS. 7A, and 7B the ordinate plots the magnitude of the output signals OS1 and OS1, and the abscissa plots the position, x, on the sensor. The signal levels of pixels in a portion other than the received-light images 33 and 34 of the sensor output signals equal a reset level RD of the CCD. In this apparatus, the distance is calculated by calculating the correlation between the two images.

Figure 8A:
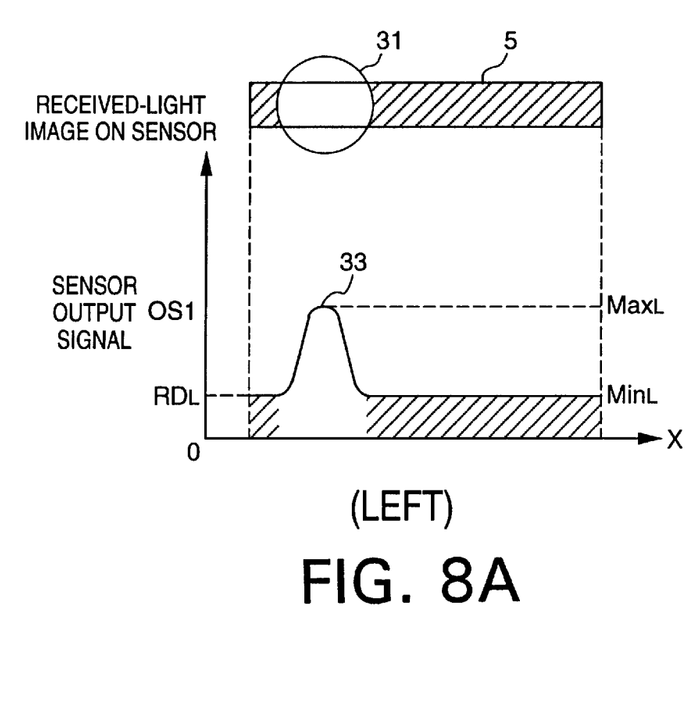
FIGS. 8A and 8B are views showing the received-light images and sensor output signal waveforms for explaining the problems of the conventional distance measuring apparatus.
Figure 8B:
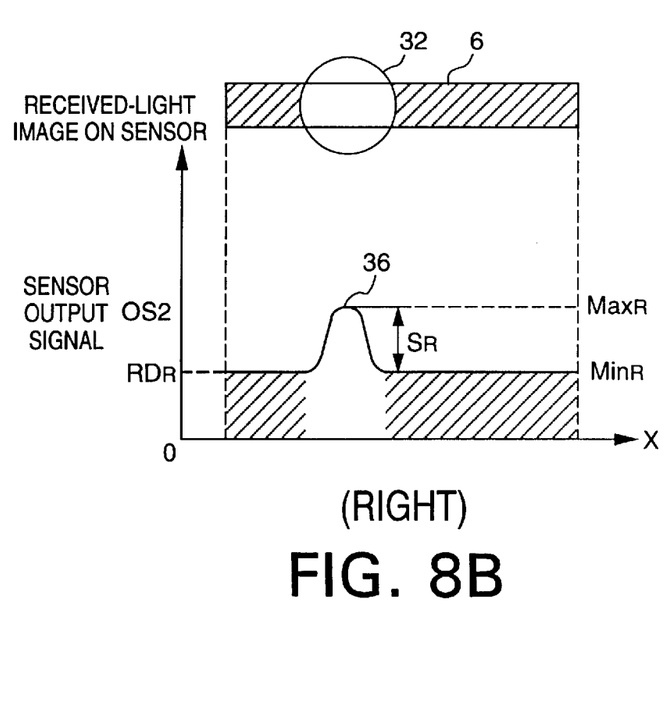

However, even when the received light images on the sensor arrays 5 and 6 are the same, as shown in FIGS. 7A, and 7B different levels RD ($RD_L$ and $RD_R$) due to different reset levels of the two sensors, and different received-light outputs ($S_L$ and $S_R$) due to differences in sensitivity of the sensor, gain of the output means 21 and 22, brightness of the-optical systems, and the like are produced in practice, as shown in FIGS. 8A and 8B. As a consequence, two received-light images 35 and 36 have different shapes. The differences between the L (left) and R (right) images are determined by the individual differences of the apparatus. When correlation is calculated for the two images shown in FIGS. 8A and 8B, respectively correlation reliability is impaired as compared to the correlation result of ideal sensor outputs that form two images of the same shape, as shown in FIGS. 7A and 7B, respectively thus lowering the distance measurement precision.

SUMMARY OF THE INVENTION

The present invention has been made to solve the above-mentioned problems, and has as its object to provide a distance measuring apparatus and method, which can improve reliability of the correlation calculation result.

More specifically, a distance measuring apparatus, which comprises light projection means for projecting light toward an object to be measured, first and second photoelectric conversion means each consisting of an array of a plurality of photoelectric conversion elements for receiving reflected light of the light projected to the object to be measured by the light projection means, and calculation means for calculating a distance to the object to be measured by performing a correlation calculation on the basis of first and second output signals output from the first and second photoelectric conversion means, comprises:

normalization means for normalizing minimum and maximum values in the first and second output signals, wherein the calculation means calculates the distance to the object to be measured on the basis of the first and second output signals normalized by the normalization means.

Preferably, when at least some light components of the reflected light fall outside a predetermined photoelectric conversion region and/or regions of the first and/or second photoelectric conversion means or are present in the vicinity of an end portion of a predetermined photoelectric conversion region and/or regions of the first and/or second photoelectric conversion means, or when an absolute value of a difference between the maximum values of the first and second output signals is more than a predetermined value, the normalization by the normalization means is inhibited.

For example, the normalization means preferably comprises:

minimum value normalization means for normalizing the minimum values of the first and second output signals; and maximum value normalization means for normalizing a smaller one of the maximum values of the first and second output signals to a larger maximum value after the normalization by the minimum value normalization means.

More specifically, distance measurement method, which comprises the photoelectric conversion step of projecting light toward an object to be measured, and photoelectrically converting, by first and second photoelectric conversion element groups, reflected light of the projected light to the object to be measured, and the calculation step of calculating a distance to the object to be measured by performing a correlation calculation on the basis of first and second output signals output from the first and second photoelectric conversion element groups, comprises:

the normalization step of normalizing minimum and maximum values in the first and second output signals, wherein the distance to the object to be measured is calculated in the calculation step on the basis of the first and second output signals normalized in the normalization step.

The normalization step preferably includes:

the minimum value normalization step of normalizing the minimum values of the first and second output signals; and the maximum value normalization step of normalizing a smaller one of the maximum values of the first and second output signals to a larger maximum value after the normalization in the minimum value normalization step.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

<First Embodiment>

A distance measuring apparatus according to the present invention will be described hereinafter. The present invention corrects the sensitivity difference of light-receiving systems prior to correlation calculations so as to improve the reliability of the correlation calculations. Accordingly, assume that the hardware arrangement of a distance measuring apparatus according to each embodiment of the present invention is the same as that shown in FIG. 6, and a detailed description thereof will be omitted. Also, the coordinate system in each of FIGS. 1A and 1B, 2A and 2B, etc., to 5A and 5B, respectively is the same as that in FIGS. 7A and 7B, respectively and a detailed description thereof will be omitted.

The actual sensor outputs from the apparatus shown in FIG. 6 form received-light images 36 and 35 as L and R images with different shapes, which have different levels RD ($RD_L$ and $RD_R$) due to different reset levels of two sensor arrays, and different received-light outputs ($S_L$ and $S_R$) due to differences in sensitivity of the sensor arrays, gain of the output means 21 and 22, brightness of the optical systems, and the like, as has been described above with reference to FIGS. 8A and 8B.

Figure 1A:
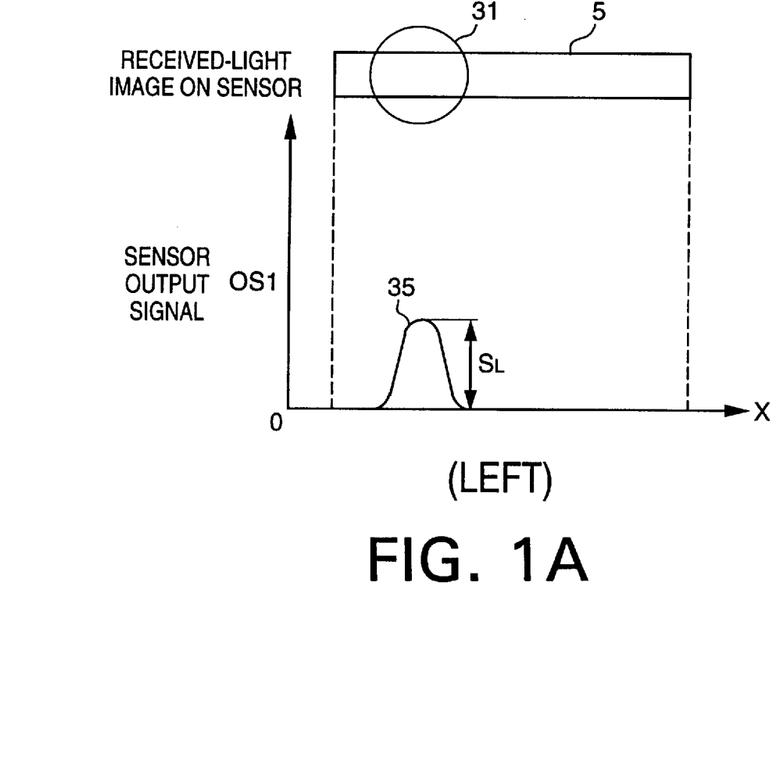
FIGS. 1A and 1B are views showing the received-light images and sensor output signal waveforms for explaining normalization of two received-light outputs.
Figure 1B:
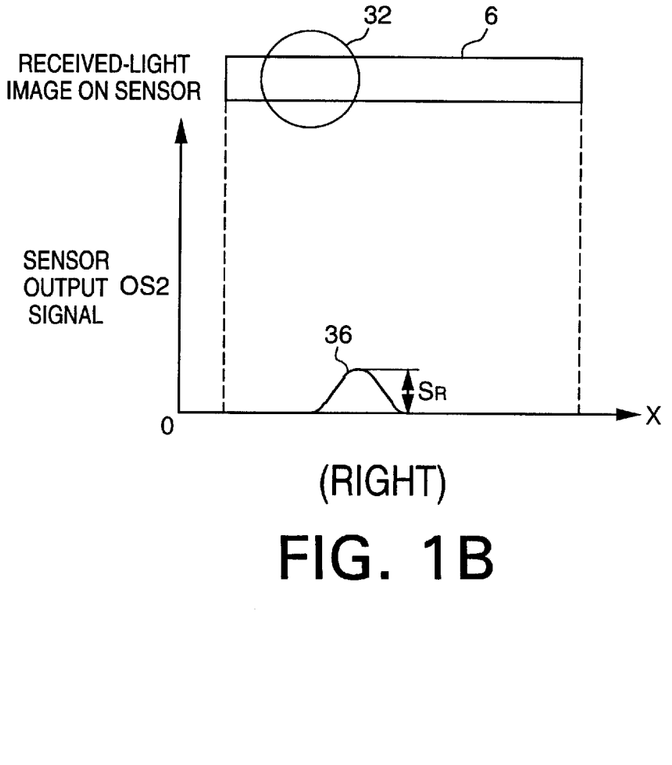

The output portions (hatched portions) from pixels on which no received-light images are formed in FIGS. 8A and 8B i.e., portions corresponding to levels RD ($RD_L$ and $RD_R$) as DC (direct current) components of the sensor output signals, have no influence on the correlation result of known correlation calculations performed after the correction processing of the present invention. Accordingly, offset adjustment is performed as Min normalization so that $Min_L$ and $Min_R$ respectively become 0, as shown in FIGS. 1A and 1B. This adjustment is attained by subtracting the level $RD_L$ from the respective pixel outputs of the sensor output signals for the L image, and subtracting $RD_R$ for the R image.

More specifically, only the outputs of pixels on which the two received-light images are formed are generated, but the received-light outputs ($S_L$ and $S_R$) still remain different. Such different outputs are generated due to the sensitivity difference between the two light-receiving systems including the sensor arrays and optical systems. The method of correcting the sensitivity difference between the light-receiving systems will be explained below.

Figure 2A:
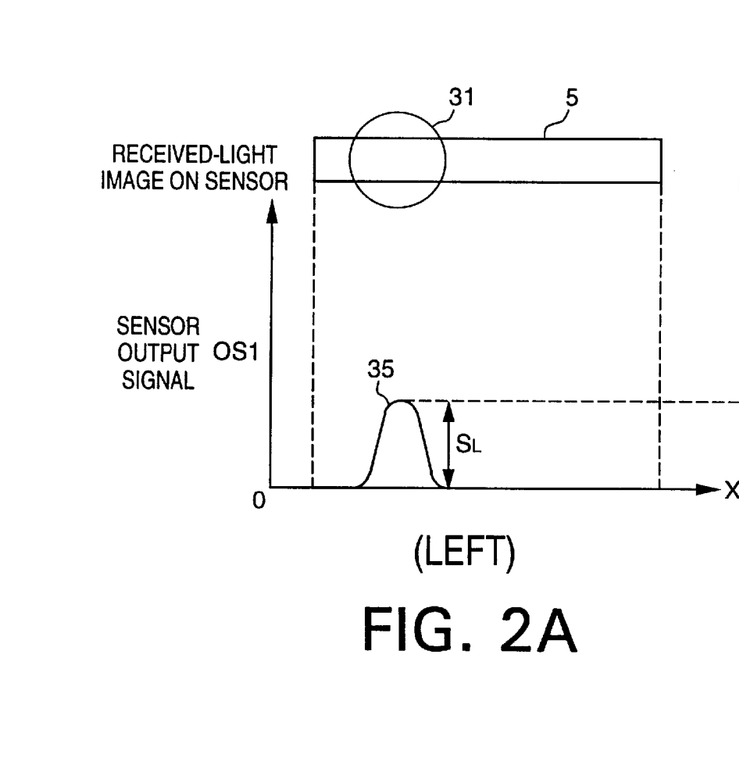
FIGS. 2A and 2B are views showing the received-light images and sensor output signal waveforms for explaining sensitivity correction according to the first embodiment of the present invention.
Figure 2B:
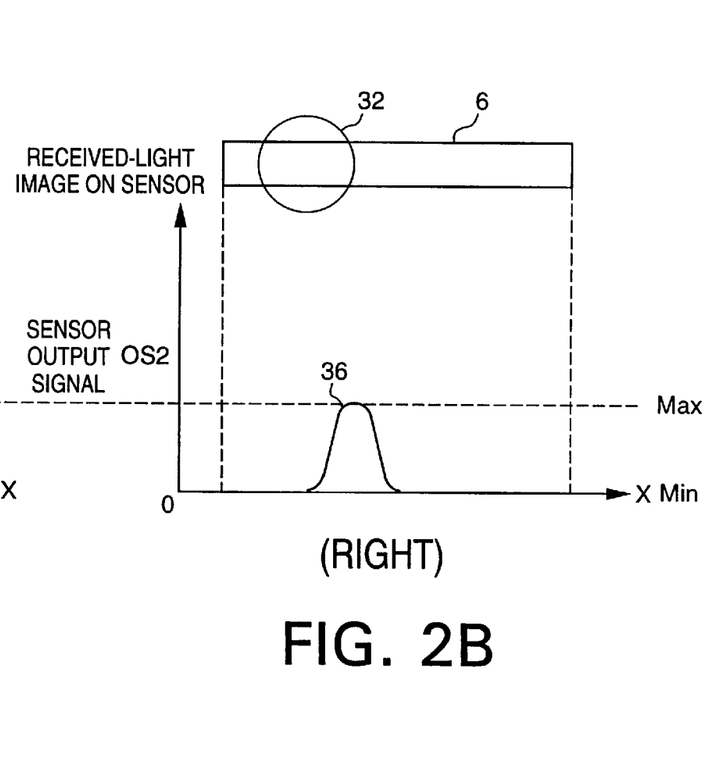

FIGS. 2A and 2B shows the correction method according to the first embodiment.

In FIGS. 2A and 2B, as Max normalization, the Max values of the two images are normalized to the higher one ($S_L$ in this case) in FIGS. 1A and 1B. In this processing, the respective pixel outputs of the sensor output signals on the $S_R$ side are multiplied by a coefficient given by:

$$K = S_L / S_R$$

That is, when the outputs of pixels on which no received-light image is formed are multiplied by K, they yield 0, and the outputs of only pixels on which the received-light image is formed on the sensor array with lower sensitivity are subjected to sensitivity correction so that $S_L$ and $S_R$ in FIGS. 1A and 1B are corrected to satisfy $S_L = S_R$, as shown in FIGS. 2A and 2B.

In this way, when the Min and Max normalizations are performed, the sensitivity correction can be attained without preparing any correction coefficient in advance, and the two images can have nearly the same shapes, thus improving the reliability of the correction result.

<Second Embodiment>

The second embodiment will be described below.

As described in the first embodiment, since the sensitivity correction can be attained and the two images can have nearly the same shapes by performing the Min and Max normalizations, the reliability of the correlation result can be improved. By adding other normalization conditions, Max normalization errors can be prevented, and the reliability of the correlation result can be further improved. Since other arrangements are the same as those in the first embodiment, a detailed description thereof will be omitted.

The conditions will be explained below.

Figure 3A:
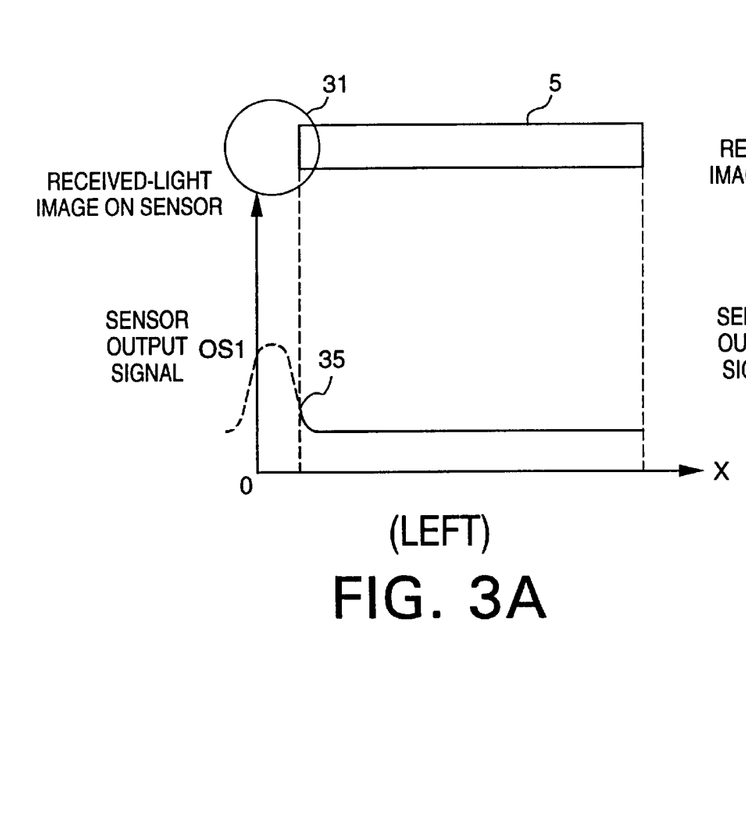
FIGS. 3A and 3B are views showing the received-light images and sensor output signal waveforms for explaining sensitivity correction according to the second embodiment of the present invention.
Figure 3B:
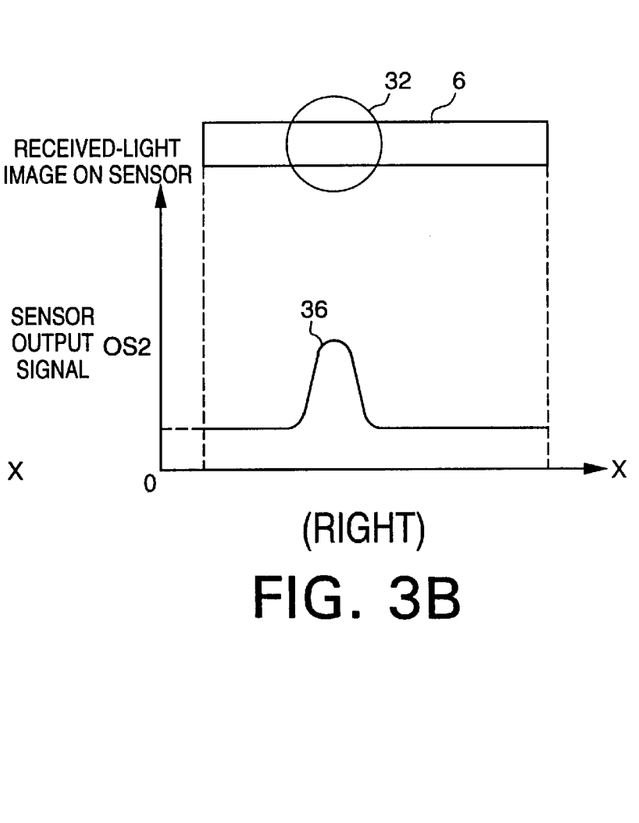
Figure 4A:
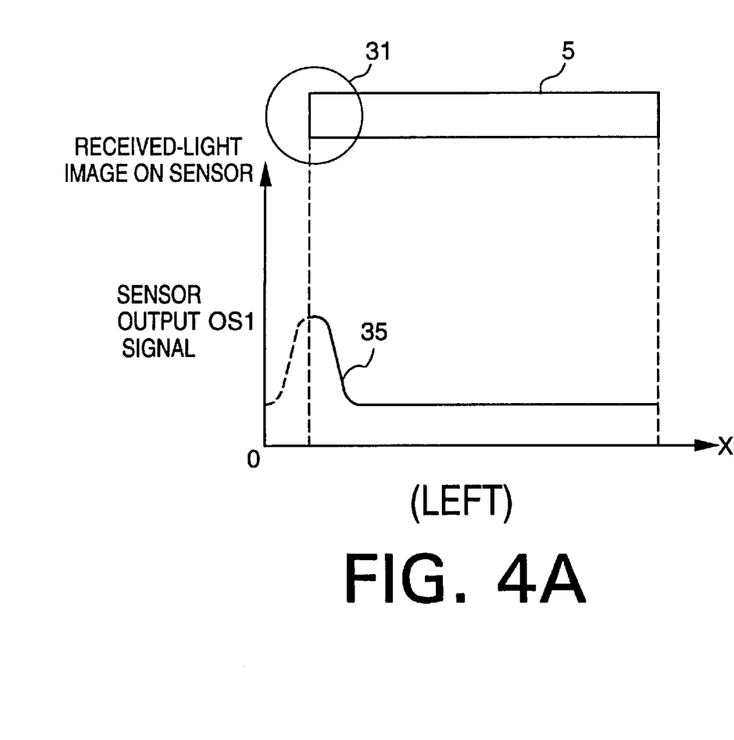
FIGS. 4A and 4B are views showing the received-light images and sensor output signal waveforms for explaining sensitivity correction according to the second embodiment of the present invention.
Figure 4B:
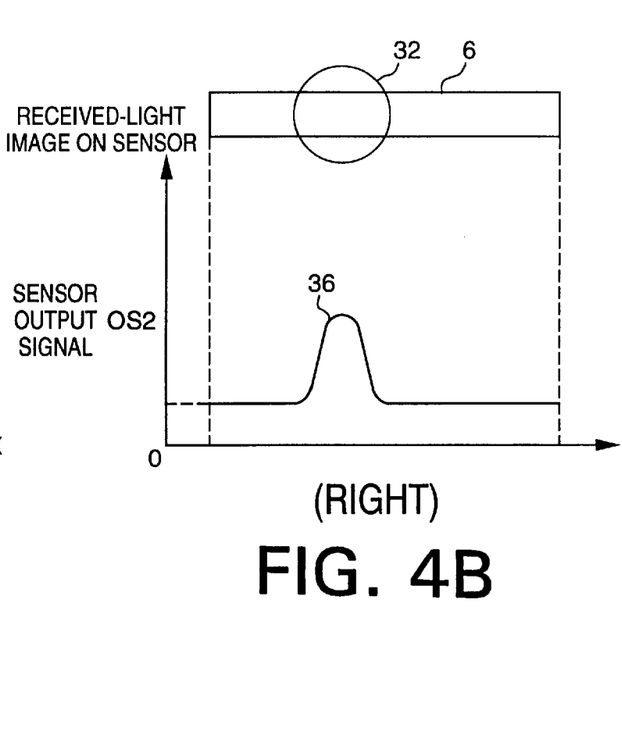

When the object to be measured is located at the nearest-distance position, incident light rays make large angles with the optical axis like the paraxial light ray in FIG. 6. For this reason, as shown in FIGS. 3A and 4A, one received-light image 35 falls outside the sensor array area. In this case, Min normalization can be made. However, according to one additional condition, when the Max value on one sensor array falls outside the sensor array area and cannot be detected, as shown in FIG. 3A, i.e., when the Max value falls outside a predetermined range of the sensor output coordinate system, the Max normalization is added inhibited. According to another additional condition, as shown in FIG. 4A, when the Max value can be recognized on the sensor array, but is located near the end of the sensor array (received-light image 31 in FIG. 4A), such image is readily influenced by disturbance light and noise components, and the reliability of the Max value is low. In practice, this image may be one shown in FIG. 3A. For this reason, in the case of FIG. 4A as well, the Max normalization is added inhibited. Such case can be easily determined by comparing the sensor output state with the predetermined range on the coordinate system.

<Third Embodiment>

The third embodiment will be explained below.

Figure 5A:
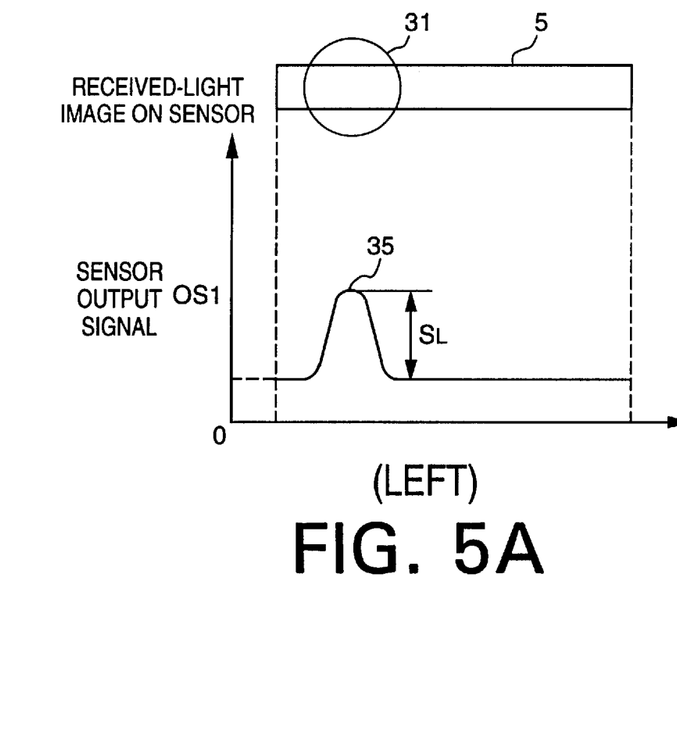
FIGS. 5A and 5B are views showing the received-light images and sensor output signal waveforms for explaining sensitivity correction according to the third embodiment of the present invention.
Figure 5B:
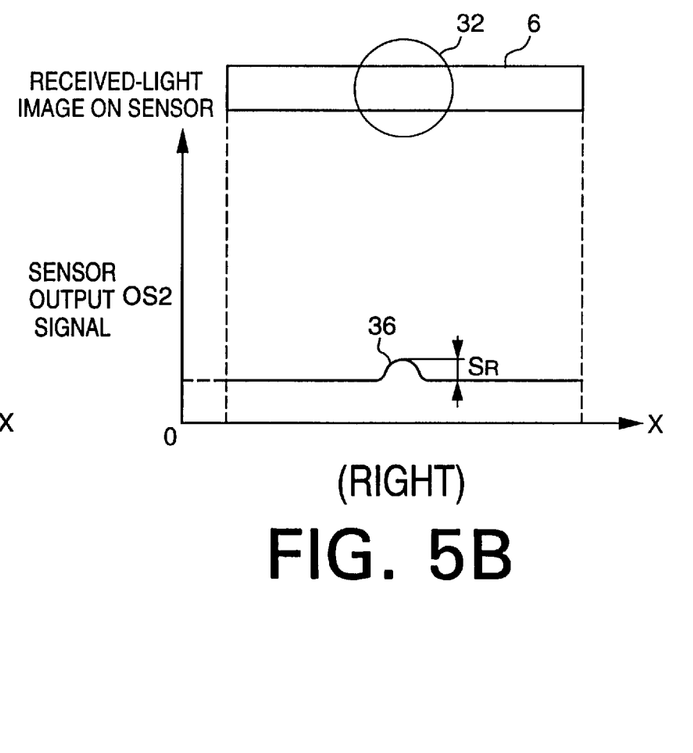

When one light-receiving system alone receives regularly reflected light from an object such as a glossy metal surface that can regularly reflect light (note that regular reflection means reflection with little diffusion of the light incident on the object), or when an obstacle locally or entirely blocks one light-receiving route, one received-light output becomes considerably low, as shown in FIG. 5B. More specifically, if the Max normalization is performed even though the received-light outputs are obviously abnormal, the reliability of the correlation result often apparently improves as if a correct distance result were obtained. In view of this problem, in the third embodiment, the absolute value of the difference between the Max values of the two images is calculated, and if the absolute value is equal to or smaller than a predetermined value L, the Max normalization is inhibited.

$$|S_L - S_R| \leq L$$

where L is a value that is confirmed by experiments that it does not give rise to any distance measurement errors even when the Max normalization is made.

Note that the correction in the first, second, and third embodiments described above is performed by the control unit 25 shown in FIG. 6.

According to the present invention, since received-light images are known in advance, the sensitivity difference is corrected by normalizing $Max_L$, $Max_R$, $Min_L$, and $Min_R$ in FIGS. 8A and 8B thereby improving the reliability of the correlation result.

In the above description, a so-called active distance measurement method that projects a beam spot onto the object to be measured has been exemplified. Also, in the case of a so-called passive distance measurement method that does not project any beam spot, a coefficient used for correcting the sensitivity difference between the two light-receiving systems may be pre-stored in a storage means, and the correction may be made using the stored correction coefficient. Since other arrangements are the same as those in the first and second embodiments, a detailed description thereof will be omitted.

As described above, according to the present invention, the correction value for the sensitivity difference between the two sensor arrays can be relatively easily and ideally obtained, the reliability of the correlation calculations performed later can be improved. Also, since the correction can be attained without obtaining and storing any correction value for the sensitivity difference between the two sensor arrays in advance in, e.g., a memory, the time required for the process of calculating the correction value on the production line upon mass-production can be shortened, and a memory for storing the correction value can be omitted, thus reducing the manufacturing cost.

As many apparently widely different embodiments of the present invention can be made without departing from the spirit and scope thereof, it is to be understood that the invention is not limited to the specific embodiments thereof except as defined in the appended claims.

What is claimed is:

1. A distance measuring apparatus, which comprises light projection means for projecting light toward an object to be measured, first and second photoelectric conversion means each consisting of an array of a plurality of photoelectric conversion elements for receiving reflected light of the light projected to the object to be measured by said light projection means, and calculation means for calculating a distance to the object to be measured by performing a correlation calculation on the basis of first and second output signals output from said first and second photoelectric conversion means, comprising:

normalization means for normalizing minimum and maximum values in the first and second output signals, wherein said calculation means calculates the distance to the object to be measured on the basis of the first and second output signals normalized by said normalization means.

2. A apparatus according to claim 1, wherein when at least some light components of the reflected light fall outside a predetermined photoelectric conversion region and/or regions of said first and/or second photoelectric conversion means, the normalization by said normalization means is inhibited.

3. A apparatus according to claim 2, wherein the light components which fall outside the predetermined photoelectric conversion region are detected on the basis of output distributions of the first and second output signals output from said first and second photoelectric conversion means.

4. A apparatus according to claim 1, wherein when at least some light components of the reflected light are present in the vicinity of an end portion of a predetermined photoelectric conversion region and/or regions of said first and/or second photoelectric conversion means, the normalization by said normalization means is inhibited.

5. A apparatus according to claim 4, wherein the light components which are present in the vicinity of the end portion of the predetermined photoelectric conversion region are detected on the basis of output distributions of the first and second output signals output from said first and second photoelectric conversion means.

6. A apparatus according to claim 1, wherein when an absolute value of a difference between the maximum values of the first and second output signals is more than a predetermined value, the normalization by said normalization means is inhibited.

7. A apparatus according to claim 1, wherein said normalization means comprises:

minimum value normalization means for normalizing the minimum values of the first and second output signals; and maximum value normalization means for normalizing a smaller one of the maximum values of the first and second output signals to a larger maximum value after the normalization by said minimum value normalization means.

8. A apparatus according to claim 7, wherein when at least some light components of the reflected light fall outside a predetermined photoelectric conversion region and/or regions of said first and/or second photoelectric conversion means, the normalization by said maximum value normalization means is inhibited.

9. A apparatus according to claim 7, wherein when at least some light components of the reflected light are present in the vicinity of an end portion of a predetermined photoelectric conversion region and/or regions of said first and/or second photoelectric conversion means, the normalization by said maximum value normalization means is inhibited.

10. A apparatus according to claim 7, wherein when an absolute value of a difference between the maximum values of the first and second output signals is more than a predetermined value, the normalization by said maximum value normalization means is inhibited.

11. A distance measurement method, which comprises the photoelectric conversion step of projecting light toward an object to be measured, and photoelectrically converting, by first and second photoelectric conversion element groups, reflected light of the projected light to the object to be measured, and the calculation step of calculating a distance to the object to be measured by performing a correlation calculation on the basis of first and second output signals output from said first and second photoelectric conversion element groups, comprising:

the normalization step of normalizing minimum and maximum values in the first and second output signals, wherein the distance to the object to be measured is calculated in the calculation step on the basis of the first and second output signals normalized in the normalization step.

12. A method according to claim 11, wherein when at least some light components of the reflected light fall outside a predetermined photoelectric conversion region and/or regions of said first and/or second photoelectric conversion element groups, the normalization in the normalization step is inhibited.

13. A method according to claim 12, wherein the light components which fall outside the predetermined photoelectric conversion region are detected on the basis of output distributions of the first and second output signals output from said first and second photoelectric conversion element groups.

14. A method according to claim 11, wherein when at least some light components of the reflected light are present in the vicinity of an end portion of a predetermined photoelectric conversion region and/or regions of said first and/or second photoelectric conversion element groups, the normalization in the normalization step is inhibited.

15. A method according to claim 14, wherein the light components which are present in the vicinity of the end portion of the predetermined photoelectric conversion region are detected on the basis of output distributions of the first and second output signals output from said first and second photoelectric conversion element groups.

16. A method according to claim 11, wherein when an absolute value of a difference between the maximum values of the first and second output signals is more than a predetermined value, the normalization in the normalization step is inhibited.

17. A method according to claim 11, wherein the normalization step includes:

the minimum value normalization step of normalizing the minimum values of the first and second output signals; and the maximum value normalization step of normalizing a smaller one of the maximum values of the first and second output signals to a larger maximum value after the normalization in the minimum value normalization step.

* * * * *

UNITED STATES PATENT AND TRADEMARK OFFICE
CERTIFICATE OF CORRECTION

PATENT NO. : 5,864,720
DATED : January 26, 1999
INVENTOR(S) : Hiroshi Miyanari

It is certified that error appears in the above-identified patent and that said Letters Patent is hereby corrected as shown below:

Column 2, lines 54-55, delete "FIGS. 7A, and 7B" and insert therefor --FIGS. 7A and 7B,--.

Column 2, lines 63-64, "FIGS. 7A, and 7B" and insert therefor --FIGS. 7A and 7B,--.

Column 3, line 7, delete "respectively correlation" and insert therefor --respectively, correlation--.

Column 3, line 10, delete "respectively thus" and insert therefor --respectively, thus--.

Column 4, line 66, delete "respectively and" and insert therefor --respectively, and--.

Column 5, line 12, delete "8B i.e.," and insert therefor --8B, i.e.,--.

Column 5, line 30, delete "shows" and insert therefor --show--.

Column 6, line 36, delete "$|S_L-S_R| \leq L$" and insert therefor --$|S_L-S_R| \leq L$--.

Column 6, line 47, delete "8B thereby" and insert therefor --8B, thereby--.

Signed and Sealed this

Seventeenth Day of August, 1999

Attest:

Q. TODD DICKINSON

*Attesting Officer*    *Acting Commissioner of Patents and Trademarks*